United States Patent

[11] 3,549,893

| [72] | Inventor | Erich L. Gibbs<br>3001 M. L. King Jr. Drive, Chicago, Ill. 60616 |
|---|---|---|
| [21] | Appl. No. | 761,082 |
| [22] | Filed | Sept. 20, 1968 |
| [45] | Patented | Dec. 22, 1970 |

[54] PHOTOELECTRIC LIQUID LEVEL SENSOR USING BAFFLE
8 Claims, 5 Drawing Figs.

| [52] | U.S. Cl. | 250/218, 356/103 |
|---|---|---|
| [51] | Int. Cl. | G01n 21/24 |
| [50] | Field of Search | 250/218; 356/244, 207, 208, 103, 104 |

[56] References Cited
UNITED STATES PATENTS

| 2,980,802 | 4/1961 | Bracey et al. | 250/218 |
| 3,248,551 | 4/1966 | Frommer | 250/218 |
| 3,358,148 | 12/1967 | Conklin et al. | 356/104 |

Primary Examiner—Walter Stolwein
Assistant Examiner—Martin Abramson
Attorney—Hill, Sherman, Meroni, Gross & Simpson ABSTRACT: A sensing device responsive to the change in level of a liquid in a chamber disposed in the radiation path between a radiation source and a responsive radiation device, in which the optical characteristics of the liquid with respect to the radiation of said source are utilized, when such liquid intersects said radiation path, to focus radiation, passing a baffle, upon the radiation responsive device, which in the absence of liquid in said radiation path is operatively disposed in the umbra created by such baffle.

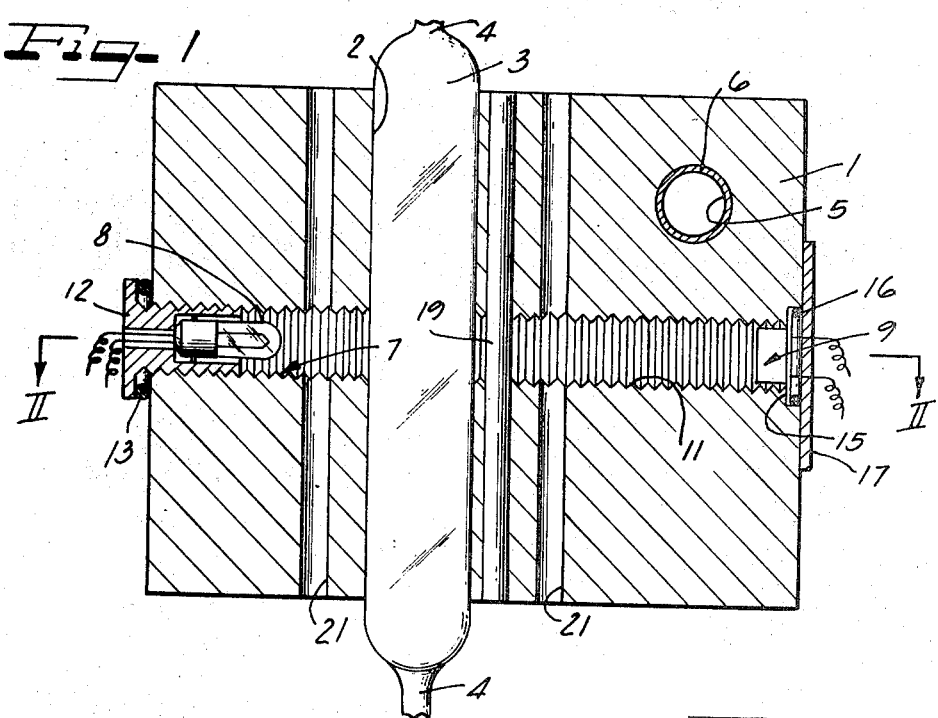
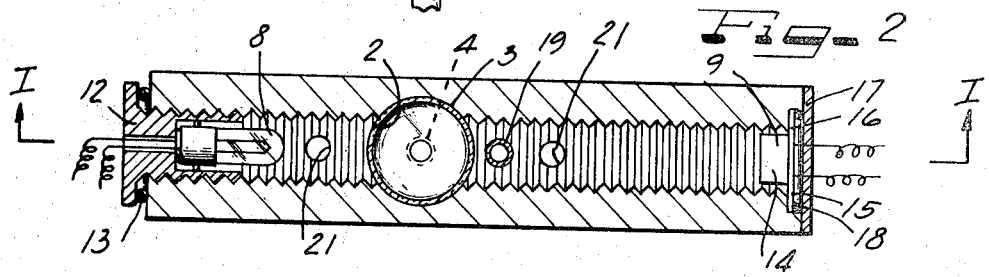
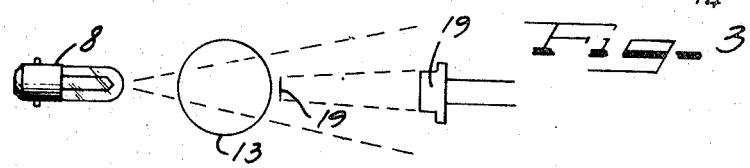
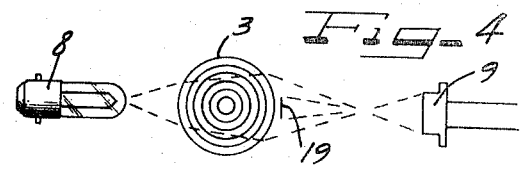
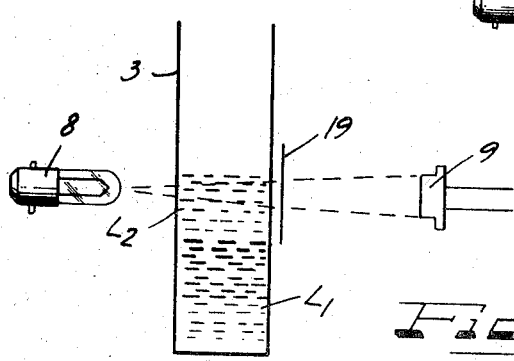

PHOTOELECTRIC LIQUID LEVEL SENSOR USING BAFFLE

BACKGROUND OF THE INVENTION

The invention is directed generally to a device for sensing changes in the level of a liquid and has particular application where, for one reason or another, it is undesirable to physically contact the liquid, as for example by means of a float or other mechanical element, or by utilization of the electrical resistance or other characteristic of such liquid, as for example in an amperemetric control.

A typical example of a problem to which the present invention is particularly adapted would be the level control of very pure water. In this case the high electrical resistance of such water would make amperemetric control difficult because of the great possibility of spurious leakage currents. On the other hand the use of floats or other mechanical devices would create problems with respect to the very careful treatment required to prevent contamination thereby of the water. Obviously in such cases serious problems could arise where it was desirable or necessary to employ a closed or pressurized water system.

The present invention enables an accurate sensing of a liquid level without direct physical contact electrically or mechanically with the liquid involved.

BRIEF SUMMARY OF THE INVENTION

The present invention utilizes the optical properties of the liquid being monitored, in particular the refractive properties and the effect thereof upon radiation passing from a source to a suitable sensing element. Thus, such source may be a light producing element and the sensing unit a light responsive device, which are so positioned that the liquid involved may be operatively interposed in such path with the fluctuation range of such level extending into and out of such transmission path. The chamber for such liquid is so constructed that the refractive properties of the liquid may be employed to provide the criteria for control of the responsive device. Considerably greater output differentials may be derived in the output circuit of the sensing device by utilization of a baffle in the transmission path between the radiation source and the responsive device in which the baffle is so disposed and of such configuration that, in the absence of fluid on the transmission path, the baffle will prevent the radiation from striking the radiation responsive device, but when the liquid is disposed on the transmission path radiation will be directed to the responsive device to actuate the same. The radiation source expediently may be a simple light bulb and the radiation responsive means may be a suitable light responsive cell.

The invention thus has among its objects the production of a sensing device which may be extremely simple in construction, foolproof in operation and very efficient in operation.

More particularly, the present invention enables the achievement of a relatively sharp operational response in the sensing circuit, providing a large operational ratio between operative and nonoperative conditions of the sensing device.

As no movable or stationary elements need be employed in direct contact with the liquid being sensed, the invention is capable of employment with substantially any type of liquid which possesses suitable optical characteristics, irrespective of corrosive or other characteristics of the liquid which would prohibit or restrict arrangements involving direct contact therewith. In some applications it may be desirable to utilize an additional liquid as the direct actuating medium.

The invention is, for example, particularly adapted for use as a low level sensing device which is fail-safe, as failure of the light source, its power supply, or the photosensitive cell will have an affect equivalent to a fall in the liquid and thus immediately signal such failure.

Other advantages of the present invention will be obvious to those skilled in the art from the disclosure herein given.

BRIEF DESCRIPTION OF DRAWINGS

In the drawings wherein like reference characters indicate like or corresponding parts:

FIG. 1 is a vertical section of a sensing device constructed in accordance with the invention, taken approximately on the line I–I of FIG. 2;

FIG. 2 is a transverse section taken approximately on the line II–II of FIG. 1;

FIG. 3 is a diagrammatic figure, generally corresponding to FIG. 2, illustrating the conditions in the absence of liquid in the light transmission path;

FIG. 4 is a similar figure illustrating the conditions in the presence of fluid on the light transmission path; and FIG. 5 is an elevational view of a structure corresponding to that of FIG. 3, illustrating the use of an additional liquid.

DETAILED DESCRIPTION OF INVENTION

Referring to FIGS. 1 and 2, the embodiment of the invention therein illustrated may employ a single body member 1 of suitable material, as for example wood, plastic and the like, which is provided with a vertically extending cylindrical bore 2, as viewed in FIG. 1, in which may be supported a tubular liquid-receiving container 3, defining a chamber illustrated in the present embodiment as being connected at its opposite ends to tubular sections 4 of reduced diameter, the construction illustrated thus being similar to a pipette or the like. Assuming, for example, that the liquid involved is water, the member 3 may be formed from a suitable glass. The block 1 also may be provided with a bore 5 therein for receiving a complementary shaped rod or tube 6 on which the block 1 may be mounted.

Extending transversely through the block 1 is a second bore 7, the axis of which extends at right angles to and intersects the axis of the bore 2. Disposed adjacent the left end of the bore 7, as viewed in FIG. 1, is a light source illustrated as a light bulb 8 and disposed adjacent the opposite end of the bore is a light responsive cell indicated generally by the numeral 9, the lamp 8 and cell 9 being substantially aligned on the axis of the bore 7 and disposed at opposite sides of the container 3 whereby the latter extends across the light transmission path from the bulb 8 to the cell 9. The bore or barrel 7 preferably is so constructed that reflection of light from the lamp 8 along the barrel to the cell 9 will be minimized and, in the embodiment illustrated, this is accomplished by threading the barrel as indicated by the reference numeral 11, such threading also providing means for mounting an externally threaded lamp socket 12 in which the lamp 8 is mounted. If desirable a suitable gasket such as an O-ring 13 may be disposed between the enlarged cap portion of the socket 12 and the adjacent face of the block 1.

The cell 9 may likewise be suitably mounted, the particular mounting arrangement depending upon the configuration of the cell structure. In the particular embodiment illustrated the cell 9 is of generally cylindrical construction having a cylindrical body 14 which is provided at its rear face with an outwardly extending flange 15 and to accommodate such cell the block 1 is illustrated as being provided with a counterbore 16. The body portion 14 of the cell thus may be disposed in the barrel 7 and the flange 15 in the counterbore 16, with the cell being retained in place by a suitable cap member 17 screwed or otherwise secured to the block 1, an O-ring 18 being illustrated as disposed between the flange 15 and the cap 17.

Also intersecting the barrel 7 is a light baffle which, in this embodiment is illustrated in the form of a cylindrical tube 19, disposed in a complemental bore in the block 1, which is so disposed that the axis of the tube 19 extends substantially parallel to the axis of the bore 2 and thus to the axis of the container 3. As will be clear from a reference to FIG. 2, the diameter of the baffle 19 is considerably less than the diameter of the bore 7 and thus forms a vertically extending baffle member aligned on the light transmission path from the lamp 8 to the cell 9.

The block 1 also may be provided with vent means which in the embodiment illustrated is in the form of two vertically extending bores 21 which respectively intersect the barrel 7 at opposite sides of the container 3, thus providing ventilation of the barrel 7.

The operation of the described sensing device may be readily understood from a reference to FIGS. 3 and 4. Thus, in the absence of liquid in the container 3, light from the lamp 8 will pass through the walls of the container 3 with relatively little affect on the light beam, the rays of which will extend in generally diverging directions from the bulb 8, as indicated in broken lines, with the cell 9 being substantially completely within the shadow produced by the baffle 19 i.e. in what may be termed an umbra. Consequently the cell will be in its relatively nonconductive operative state.

However, in the event the liquid in the container 3 reaches a sufficient height to intersect the barrel the relatively high refractive index of the liquid will result in the refraction of the light passing into and out of the container whereby the light rays will be converged to direct such rays upon the cell 9, so that the latter may now be deemed to be in a penumbra, with such cell responding to the light striking the same and thus entering its relatively conductive operative state.

It is believed apparent that the proportions and dimensioning of the elements of a sensing unit in accordance with the invention will be determined by the particular application to which the device is to be put, and in particular, with respect to the characteristics of the liquid involved.

Obviously, substantially any liquid that will transmit light at some wavelength or wavelengths may be utilized, provided that the liquid has a refractive index that is sufficiently great that adequate convergence of the light beam may be achieved with a filled container of reasonable size. Likewise the ratio of the parallel transmittance of the container must be sufficiently high that the intensity of light falling on the photosensitive cell, when the container is filled, will be sufficiently greater than the intensity of light falling on the cell when the container is empty to provide the desired operation.

Likewise, included in the requirements for the container would be that it transmit the particular light utilized, that it not disperse the light to a degree which would reduce the sensitivity to an intolerable level and, of course, it must not effect the liquid adversely or vice versa. By way of example pyrex glass is suitable for use with a great number of applications.

The proportioning and dimensioning of the device again will be dependent upon the characteristics of the liquid and container.

While I have illustrated the baffle member 19 as being disposed between the container 3 and the cell 9, in some applications it may be desirable to dispose the baffle at the opposite side of the container 3 between the latter and the lamp 8 with the size of the baffle and positions of the respective elements being selected accordingly.

Likewise, while I have illustrated the barrel 7 as being internally threaded throughout its length to minimize reflection it may be satisfactory in many applications merely to coat the barrel interior with a relatively nonreflecting material. Likewise, the inclusion and number of vent passageways, such as the bores 21, will depend upon the specific application, such vents being particularly desirable for the dissipation of heat produced by the lamp 8 etc.

While I have described the invention in connection with the direct use of the liquid involved to actuate the device, the invention is also of value in many applications where the liquid itself cannot be used to directly control the light beam. In this case the additional liquid should possess the desired optical characteristics and have a density which is less than the liquid being monitored. This is schematically illustrated in FIG. 5 in which a small amount of a second liquid $L_2$ is disposed upon the column of monitored liquid $L_1$. Obviously this arrangement is satisfactory where the inclusion of the second liquid in the container 3 is not objectionable, that the fluctuation of the liquid $L_1$ is such that the container 3 and height of the column of liquid $L_2$ may be suitably dimensioned as a practical matter and that a liquid having the desired optical qualities, density and which is relatively inert with respect to the monitored liquid, is available.

It will be appreciated from the above description that the present invention is of particular advantage in applications in which contamination of the liquid is to be avoided, or where circumstances render the use of mechanical elements undesirable or impossible. Likewise with no moving parts etc., the unit will operate without adjustment or attention with a long life expectancy, and the mounting of the light source is such that focusing operations may be readily performed.

It will also be appreciated that considerably larger output signals can be obtained from the device with the use of the light baffle than could be obtained without same.

It will be also be apparent from the above description that the invention is particularly applicable as a low level control device and in such use is fail-safe, i.e., failure substantially anywhere in the sensing structure would result in an output condition corresponding to low level operation.

Having thus described my invention it will be obvious to those skilled in the art that various immaterial modifications may be made in the same without departing from the spirit of my invention, hence I do not wish to be understood as limiting myself to the exact form construction and arrangement of parts shown and described or uses mentioned.

I claim:

1. A sensing device responsive to the change in level of a liquid, comprising a source of radiation, a radiation responsive device disposed in spaced relation to said source and arranged to receive radiation therefrom, means forming a chamber for the liquid involved and constructed of a material which will transmit such radiation, said means being disposed in the path between said source and said device, and a baffle disposed between said source and said device, said baffle being of a size and shape, and so disposed with respect to said means that an umbra is created, within which the radiation responsive device is operatively disposed, when the radiation path is not intersected by liquid in said chamber, whereby said device is unactuated, liquid in said chamber being operable when intersecting said radiation path to focus radiation passing said baffle onto said radiation responsive device to actuate the same.

2. A sensing device according to claim 1, wherein said chamber is of cylindrical configuration, means forming a hollow barrel through which the radiation is to pass, axis of which extends transversely to and intersects the axis of said chamber, said barrel having one section thereof disposed at one side of said chamber, and another section at the opposite side of said chamber, said radiation source being disposed adjacent the free end of one section of said barrel and said radiation responsive device disposed adjacent the free end of the other section of said barrel, said baffle means being disposed in said barrel, and extending in the same direction as the axis of said cylindrical member.

3. A sensing device according to claim 1, comprising in further combination, a supporting member for said chamber-forming means having a bore therein in which said means extends, said chamber-forming means being of cylindrical configuration, said supporting member having a second bore therein extending transversely to an intersecting the first bore, said radiation source comprising a light source disposed adjacent one end of said second bore, said radiation responsive device comprising a light responsive cell disposed adjacent the opposite end of said second bore, said baffle means being disposed in said second bore and extending in the same direction as the axis of said cylindrical chamber.

4. A sensing device according to claim 3, wherein, said supporting member is provided with at least one passageway extending transversely to and intersecting said second bore for venting the latter.

5. A sensing device according to claim 3, wherein said first bore is provided with means for reducing reflected light paths between said light source and said light responsive cell.

6. A sensing device according to claim 3, wherein said second bore is provided with internal threads operative to reduce reflected light paths between the light source and the light responsive cell, said light source being mounted on supporting means threaded into said second bore whereby said source is readily axially movable therein for the purpose of focus adjustment.

7. A sensing device according to claim 3, wherein said baffle means comprises a cylindrical baffle member having a diameter less than that of said second bore, said baffle member intersecting said second bore with its axis extending parallel to the axis of said cylindrical chamber.

8. A sensing device according to claim 1, wherein said chamber-forming means is of a length and so disposed, with respect to said radiation source and said radiation responsive device, that a liquid may be disposed in said chamber upon the liquid to be monitored, with said second liquid being movable into and out of said radiation path in response to the rise and fall in said chamber of the liquid to be monitored.